US009273857B2

(12) United States Patent
Rosenbecker et al.

(10) Patent No.: US 9,273,857 B2
(45) Date of Patent: Mar. 1, 2016

(54) ELECTRICAL COMPONENT INCLUDING TOOL AND BATTERY CHARGER PORTS

(75) Inventors: Jay Rosenbecker, Menomonee Falls, WI (US); Gary L. Durian, West Bend, WI (US); Todd Johnson, Wauwatosa, WI (US); Wade Burch, Wauwatosa, WI (US); Joshua Feldman, Milwaukee, WI (US); Jonathan Zick, Waukesha, WI (US); Michael W. Phillips, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 883 days.

(21) Appl. No.: 13/000,164

(22) PCT Filed: Jun. 23, 2009

(86) PCT No.: PCT/US2009/048314
§ 371 (c)(1),
(2), (4) Date: Aug. 23, 2011

(87) PCT Pub. No.: WO2010/008855
PCT Pub. Date: Jan. 21, 2010

(65) Prior Publication Data
US 2011/0291617 A1      Dec. 1, 2011

Related U.S. Application Data

(60) Provisional application No. 61/074,891, filed on Jun. 23, 2008.

(51) Int. Cl.
*H01M 10/46* (2006.01)
*F21V 21/40* (2006.01)
*F04D 25/08* (2006.01)
*F21L 14/02* (2006.01)
*F21S 9/02* (2006.01)
*F04D 25/06* (2006.01)
*F21V 21/06* (2006.01)
(Continued)

(52) U.S. Cl.
CPC .......... *F21V 21/406* (2013.01); *F04D 25/0673* (2013.01); *F04D 25/08* (2013.01); *F21L 14/02* (2013.01); *F21S 9/022* (2013.01); *F21V 21/06* (2013.01); *F21W 2131/1005* (2013.01); *H02J 7/0042* (2013.01)

(58) Field of Classification Search
CPC ...... H02J 7/0044; H02J 7/0045; H02J 7/0055
USPC ................. 320/113, 115, 103, 116, 128, 138; 307/63–66
See application file for complete search history.

(56) References Cited

U.S. PATENT DOCUMENTS 1,309,140 A    7/1919   Knoblock
1,964,201 A    6/1934   Harsted
(Continued)

*Primary Examiner* — Edward Tso
(74) *Attorney, Agent, or Firm* — Michael Best & Friedrich LLP

(57) ABSTRACT

An electrical assembly selectively receives power from an external power supply. The electrical assembly includes a base that at least partially defines a tool port and a battery port and an electrical tool selectively coupled to the tool port. A rechargeable battery pack is selectively coupled to the battery port and a circuit is supported by the base and is operable to direct power to the tool port and the battery port such that the external power provides power to the electrical tool to operate the electrical tool and to recharge the rechargeable battery pack.

28 Claims, 7 Drawing Sheets

(51) Int. Cl.
*F21W 131/10* (2006.01)
*H02J 7/00* (2006.01)

(56) References Cited

U.S. PATENT DOCUMENTS

| | | | |
|---|---|---|---|
| 2,582,572 A | 1/1952 | Tulk | |
| 3,233,092 A | 2/1966 | Umholtz | |
| 3,963,972 A | 6/1976 | Todd | |
| 4,382,220 A | 5/1983 | Marshall et al. | |
| 4,424,006 A | 1/1984 | Armbruster | |
| 4,463,288 A | 7/1984 | Judd | |
| 4,483,664 A | 11/1984 | Armbruster | |
| 4,544,994 A | 10/1985 | Steeves, Jr. | |
| 4,605,993 A | 8/1986 | Zelina, Jr. | |
| 4,691,157 A | 9/1987 | McDermott | |
| 5,010,454 A | 4/1991 | Hopper | |
| 5,012,394 A | 4/1991 | Woodward | |
| 5,592,066 A | 1/1997 | Fan | |
| 5,754,124 A | 5/1998 | Daggett et al. | |
| 5,908,233 A * | 6/1999 | Heskett et al. | 362/183 |
| 5,988,828 A | 11/1999 | Prince et al. | |
| 6,018,227 A | 1/2000 | Kumar et al. | |
| 6,034,505 A * | 3/2000 | Arthur et al. | 320/113 |
| 6,176,593 B1 | 1/2001 | Spitler et al. | |
| 6,215,276 B1 | 4/2001 | Smith | |
| 6,260,985 B1 | 7/2001 | Zeller | |
| 6,534,953 B2 * | 3/2003 | Shirakawa | 320/114 |
| 6,575,590 B1 * | 6/2003 | Wadsworth | 362/119 |
| 6,636,015 B1 * | 10/2003 | Levine et al. | 320/105 |
| 6,819,080 B2 | 11/2004 | Barbeau et al. | |
| 6,821,095 B2 | 11/2004 | Dooley et al. | |
| 6,897,785 B2 | 5/2005 | Corbus | |
| 6,902,293 B2 | 6/2005 | Tang | |
| 7,222,986 B2 | 5/2007 | Mah | |
| 7,246,927 B2 | 7/2007 | Wikle et al. | |
| 7,314,286 B2 | 1/2008 | Sharrah et al. | |
| 7,621,652 B2 * | 11/2009 | Zick | 362/183 |
| 7,638,970 B1 * | 12/2009 | Gebhard et al. | 320/113 |
| 8,025,418 B2 * | 9/2011 | Zick | 362/20 |
| 8,183,825 B2 * | 5/2012 | Sa | 320/107 |
| 2005/0055795 A1 * | 3/2005 | Zeiler et al. | A47L 5/14 15/353 |
| 2005/0083013 A1 * | 4/2005 | Zick et al. | 320/114 |
| 2005/0156564 A1 | 7/2005 | Krieger | |
| 2005/0225287 A1 * | 10/2005 | Yang | 320/114 |
| 2006/0113956 A1 * | 6/2006 | Bublitz et al. | 320/112 |
| 2006/0170395 A1 | 8/2006 | Yoshimizu et al. | |
| 2006/0221602 A1 | 10/2006 | Zick | |
| 2007/0002562 A1 | 1/2007 | VanWambeke et al. | |
| 2007/0024237 A1 | 2/2007 | Cole, Jr. et al. | |
| 2007/0182372 A1 * | 8/2007 | Yang | 320/114 |
| 2008/0069694 A1 | 3/2008 | Hernandez et al. | |

* cited by examiner

ELECTRICAL COMPONENT INCLUDING TOOL AND BATTERY CHARGER PORTS

RELATED APPLICATION DATA

This application claims benefit under 35 U.S.C. Section 119(e) of U.S. Provisional Application No. 61/074,891, filed Jun. 23, 2008, which is fully incorporated herein by reference.

BACKGROUND

The present invention relates to an electric component arranged to provide DC power to various electrical devices. More specifically, the invention relates to an electrical device arranged to charge a battery pack and power a separate electrical tool.

SUMMARY

Lighting units, such as, for example, floodlights, are used on many job sites. A floodlight generally provides a wide area of illumination for the job site. A floodlight is typically supported on a surface during use (though it may be carried by a user at times). In contrast, a flashlight generally provides a comparably small area of illumination and is typically carried by a user during use (though it may be supported on a surface at times).

Many cordless products (e.g., cordless power tools, equipment, etc.) are also used on the job site. A battery charger (e.g., a power tool battery charger) and a lighting unit, such as, for example, a floodlight, as a single unit provides multiple functions in a single product.

Power outages may occur on a job site, and the sudden loss of visibility, due to the loss of an AC-powered light may cause a hindrance to work or movement around the job site. A lighting unit, such as, for example, a floodlight, which is selectively powered by AC power or by DC power (e.g., a battery pack, a power tool battery pack, etc.) may provide alternate lighting when the AC power source is unavailable (e.g., due to a power outage, due to an interruption in the supply of AC power, in an emergency situation, etc.).

In some independent aspects and in some constructions, a lighting unit, such as, for example, a floodlight, may generally include a light portion and a battery charging circuit for charging a power tool battery pack. The battery charging circuit may provide a trickle charge or a normal charge mode for the power tool battery pack, and the battery pack to be charged may selectively power the lighting unit. The lighting unit may include a status indicator for indicating, for example, the status of one or more batteries to be charged by the charging circuit.

In some independent aspects and in some constructions, an electrical component, such as, for example, a battery charger, includes a light, such as, for example, a floodlight, for illuminating a work area.

In some independent aspects and in some constructions, a lighting unit, such as, for example, a floodlight, may generally include a light portion which may selectively be powered by an AC power source or by a DC power source. A power tool battery pack may provide the DC power source to selectively power the light portion. The DC power source may supply power to the light portion when the AC power source is unavailable (e.g., due to a power outage, due to an interruption in the supply of AC power, in an emergency situation, etc.).

In such constructions, the lighting unit may include a battery support portion on which a battery is supported. In some constructions, the battery may be releasably locked to the battery support portion.

In such constructions, the lighting unit may include a power selector to select the power mode to power the light portion. The power mode selector may include a controller which controls the selection of a power mode for the lighting unit between an AC power mode and a DC power mode. The controller may automatically select the DC power mode when the AC power source is unavailable (e.g., due to a power outage, due to an interruption in the supply of AC power, in an emergency situation, etc.). The controller may selectively control charging of one or more battery packs connected to a charging circuit.

In some constructions, the lighting unit may include a pass-through plug or outlet on a portion of the lighting unit (e.g., on the base housing, on the AC power cord, etc.).

In some constructions, the lighting unit may include a battery-powered flashlight providing the light portion which is selectively powered by the DC power source. The lighting unit may include a charging assembly for charging the battery in the battery-powered flashlight. The flashlight may be removable from the lighting unit.

In some independent aspects and in some constructions, a lighting unit, such as, for example, a floodlight, may generally include a light portion having a high-watt light source, which is powered by an AC power source, and a low-watt light source, which is powered by a DC power source. The high-watt light source may include a halogen light source. The low-watt light source may be powered by the DC power source when the AC power source is unavailable (e.g., due to a power outage, due to an interruption in the supply of AC power, in an emergency situation, etc.).

In some independent aspects and in some constructions, a lighting unit, such as, for example, a floodlight, may generally include a light portion including a LED light source, and the LED light source may be selectively powered by an AC power source or by a DC power source. The LED light source may be a relatively low-watt light source which may be powered by a DC power source (e.g., a power tool battery pack) for a relatively long time.

In some independent aspects and in some constructions, a lighting unit, such as, for example, a floodlight, may generally include a light portion including a light source and a light housing and a base portion including a base housing. The light housing may be movable (e.g., pivotable) relative to the base housing between a closed position, in which the light source is at least partially covered by the base housing, and an open position. The lighting unit may include a light source supported on a head which is pivotable relative to a housing (e.g., the light housing, the base housing, etc.). The head may be pivotable about a single axis or about multiple axes.

In such constructions, the lighting unit may include a position fixing arrangement, such as a detent arrangement, for releasably holding the light housing in a selected position relative to the base housing. The lighting unit may include a locking assembly for releasably holding the light housing in a selected position (e.g., in a closed position) relative to the base housing.

A handle may be provided to carry the lighting unit to, from and around a worksite. The handle may provide a protective structure to protect a portion of the lighting unit, such as, for example, the light portion, a battery charger portion, a battery, etc. The lighting unit may include a separate protective structure, such as a protective bar, for protecting a portion of the lighting unit.

In some independent aspects and in some constructions, a lighting unit, such as, for example, a floodlight, may be constructed to be a heavy-duty, durable lighting unit for use on a job site. The lighting unit may be constructed to withstand impacts which may occur on a job site. In some constructions, the lighting unit may include another electrical component such as, for example, an audio component. In some constructions, the lighting unit may include an internal power source, such as, for example, a generator, a supply battery, etc.

In some independent aspects and in some constructions, a lighting unit, such as, for example, a floodlight, may be selectively mounted or supported on various surfaces, such as, for example, supported on a horizontal work surface, hung from a substantially vertical wall or support, supported on a separate frame or stand, etc. The lighting unit may include a telescoping support assembly for adjusting the height of a light portion relative to a housing (e.g., a light housing, a base housing, a separate frame or stand, etc.).

In such constructions, the lighting unit may include connecting structure for releasably connecting the lighting unit to a support. Such connecting structure may be similar to a Clip-Lok™ system provided for power tools, accessories, etc.

In some independent aspects and in some constructions, a lighting unit, such as, for example, a floodlight, may include a storage compartment for storing tools, extra bulbs for the light portion, etc.

In one construction, the invention provides an electrical assembly that selectively receives power from an external power supply. The electrical assembly includes a base that at least partially defines a tool port and a battery port and an electrical tool selectively coupled to the tool port. A rechargeable battery pack is selectively coupled to the battery port and a circuit is supported by the base and is operable to direct power to the tool port and the battery port such that the external power provides power to the electrical tool to operate the electrical tool and to recharge the rechargeable battery pack.

In another construction, the invention provides an electrical component system includes a base that at least partially defines a tool port and a battery port. A battery pack is selectively connectable to the battery port and an electrical tool is selectively connectable to the tool port and the battery pack. A circuit is positioned substantially within the base and is operable in response to the receipt of an external AC power to convert the AC power to a DC power and deliver the DC power to the tool port to operate the electrical tool and to the battery port to charge the battery pack. In the absence of the external AC power, the circuit directs DC power from the battery pack to the electrical tool to power the electrical tool.

In yet another construction, the invention provides an electrical component system that includes a base that at least partially defines a tool port and a battery port. A battery pack is selectively connectable to the battery port and an electrical tool is selectively connectable to the tool port and the battery pack. A circuit is positioned substantially within the base and is operable to deliver power from one of an external source and the battery pack to the electrical tool. The electrical tool is directly connectable to the battery pack to receive power from the battery pack without the circuit.

One or more independent features and independent advantages are set forth in the following detailed description.

Figure 1:
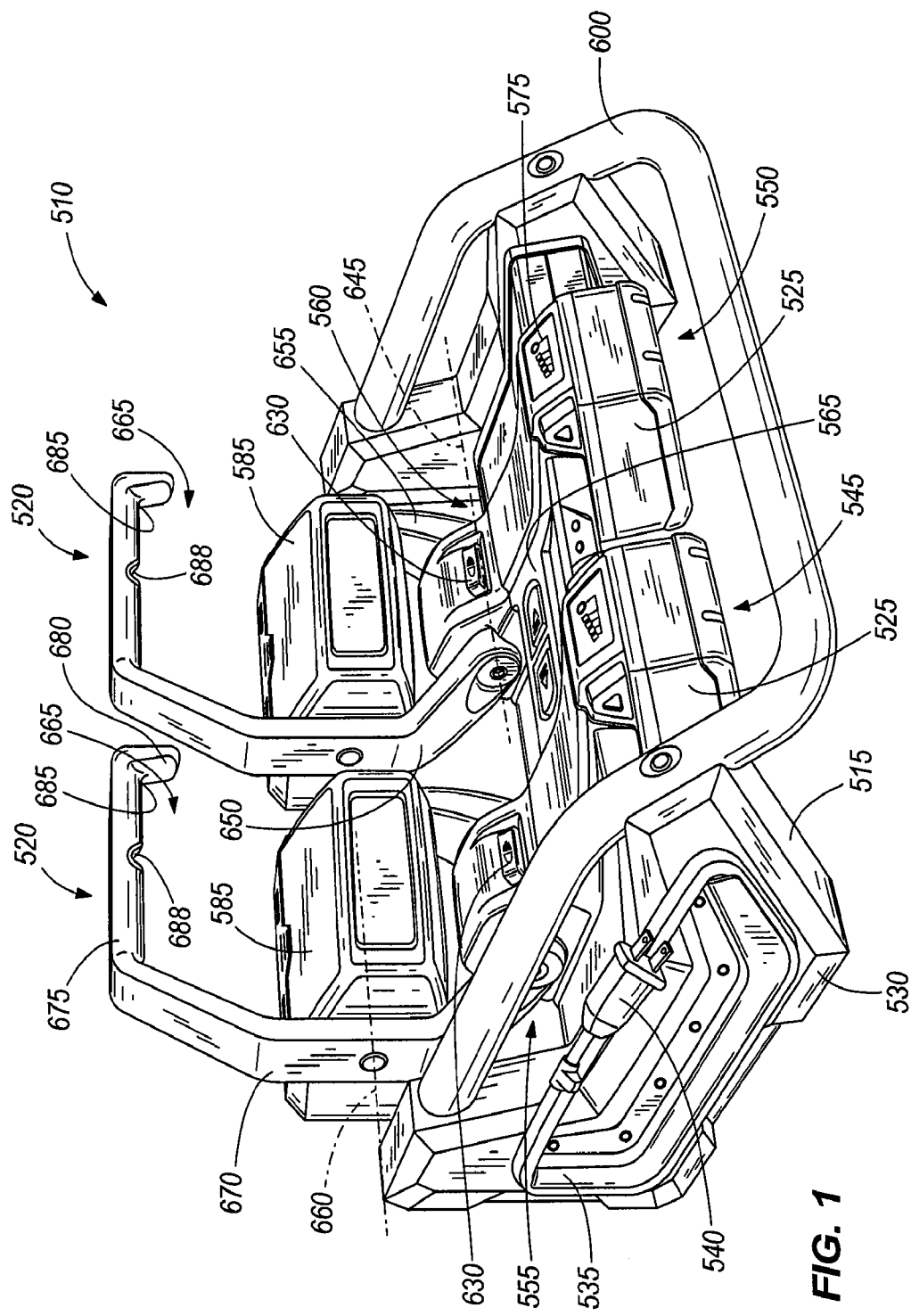
FIG. 1 is a perspective view of an electrical component including rechargeable battery packs and accessories attached thereto.

Before at least one embodiment of the invention is explained in detail, it is to be understood that the invention is not limited it its application to the details of the construction and the arrangements of the components set forth in the following description or illustrated in the drawings. The invention is capable of other embodiments and of being practices or carried out in various ways. In addition, it is understood that the phraseology and terminology used herein is for the purpose of description and should not be regarded as limiting.

The use of "including", "comprising", or "having" and variations thereof herein is meant to encompass the items listed thereafter and equivalents thereof as well as additional items. Unless limited otherwise, the terms "connected", "coupled" and variations thereof herein are used broadly to encompass direct and indirect connections and couplings. In addition, the terms "connected" and "coupled" and variations thereof are not restricted to physical or mechanical connections or couplings.

DETAILED DESCRIPTION

FIGS. 1-9 illustrate an arrangement of an electrical component 510 (sometimes referred to as an electrical component assembly) that can provide AC or DC power to various electrical attachments. The components of FIGS. 1-9 are intended for use in construction sites, homes, factories, and the like. As such, the components are rugged and yet lightweight to allow for easy moving and positioning.

Figure 9:
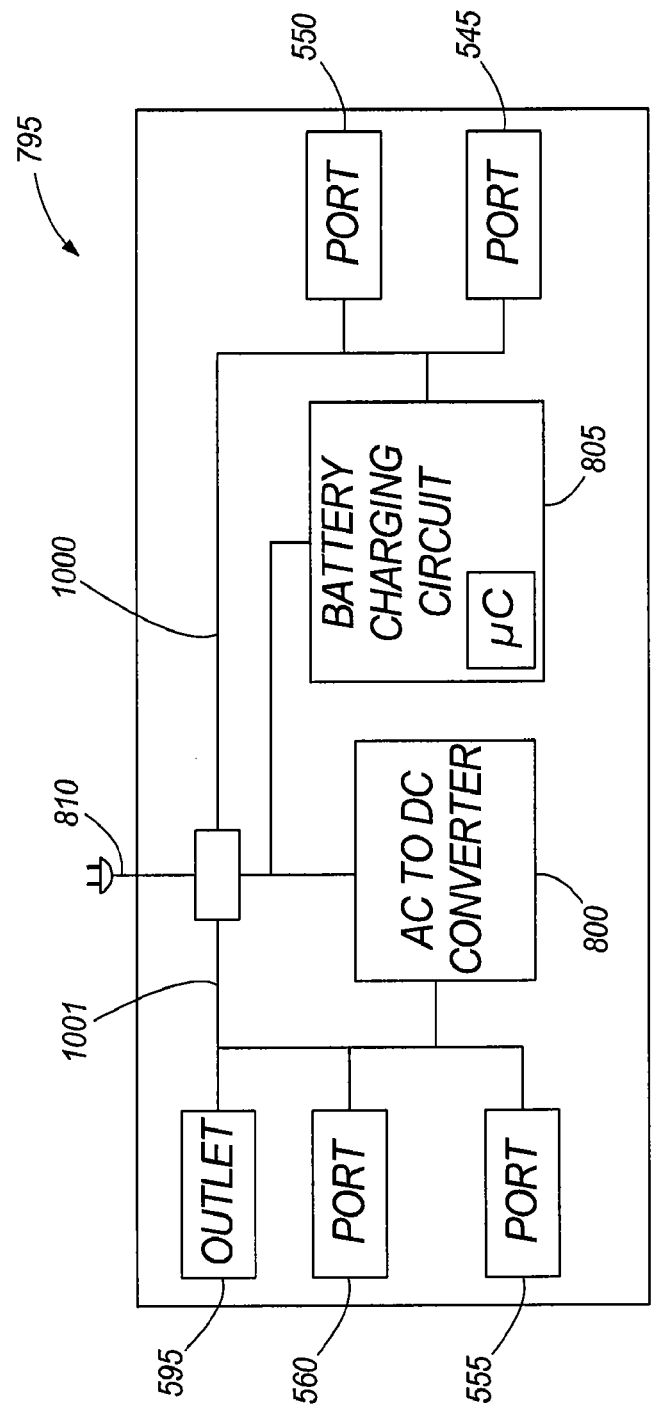
FIG. 9 is a schematic illustration of the electrical component of FIG. 1.

With reference to FIG. 1, the electrical component 510 includes a base 515 that provides one or more tool ports 555, 560 and one or more battery ports 545, 550. The tool ports 555, 560 provide an engagement point for one or more electrical tools 520 (sometimes referred to as electrical accessories or attachments) that are selectively attachable to the base 515. The battery ports 545, 550 provide an engagement point for one or more rechargeable battery packs 525 that are selectively attachable to the base 515. The base 515 also supports electrical circuitry and components disposed within the base 515 and somewhat protected by the base 515. The circuitry, as will be discussed in detail with regard to FIG. 9, is arranged to use AC power, when available to recharge any rechargeable battery packs 525 that may be attached to the base 515 and provide operating power to any electrical tools 520 that may be attached to the base 515.

Figure 8:
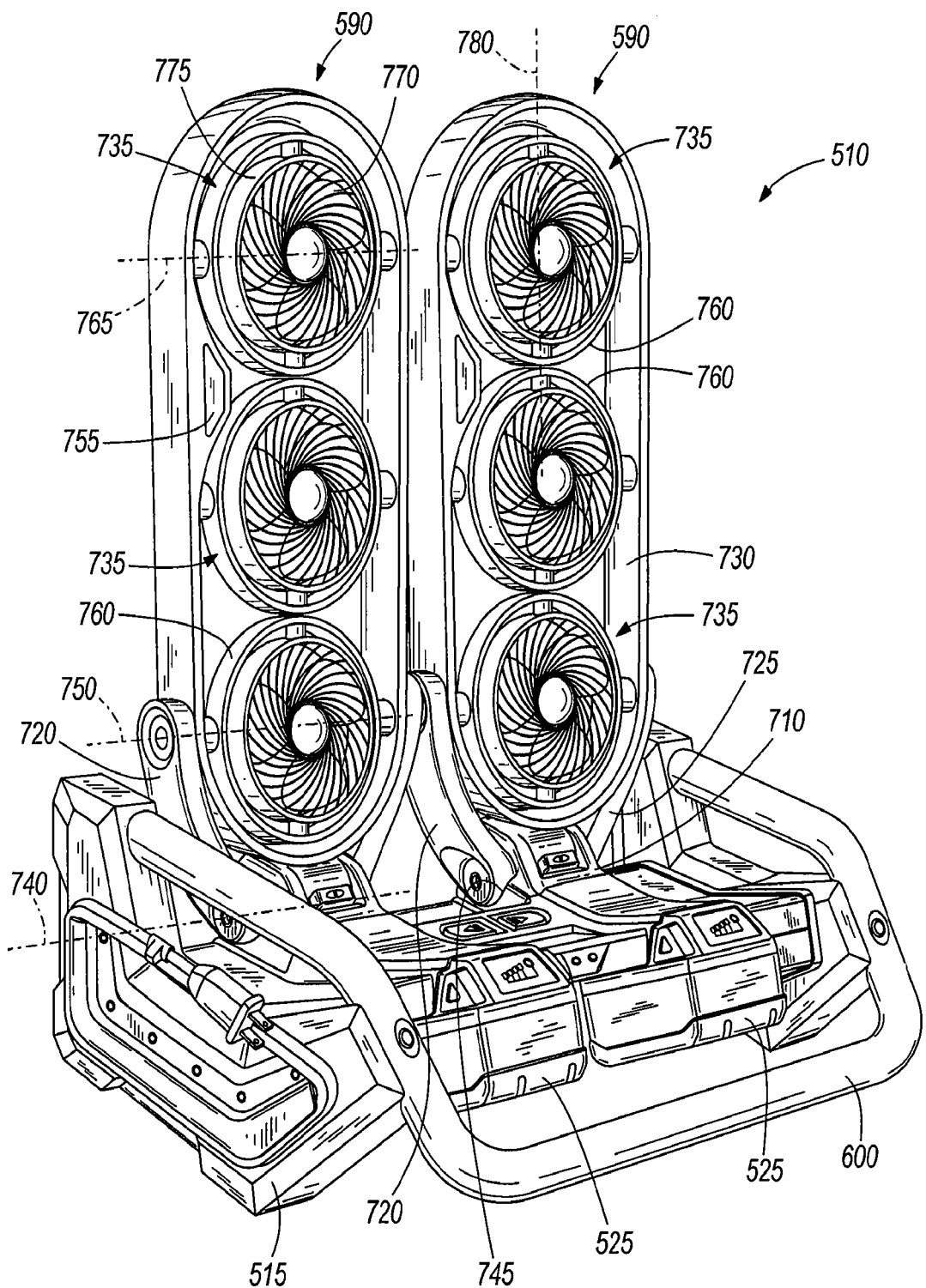
FIG. 8 is a perspective view of the electrical component of FIG. 1 including rechargeable battery packs and a second accessory attached.

In the illustrated construction, the electrical tool 520 is a flood light that is capable of attaching to one of the tool ports 555. In addition to the illustrated floodlight, other tools can be attached to the tool ports 555. For example, a fan as illustrated in FIG. 8 could be attached to one of or both of the tool ports 555. As one of ordinary skill will realize, other tools (e.g., spotlights, space heaters, heated fans, radios, etc.) could also be attached to one of the tool ports 555, 560. In addition, tools 520 could be arranged to simultaneously attach to multiple tool ports 555, 560 to increase the amount of power deliverable to the tool 520. For example, a high capacity space heater may attach to both tool ports 555, 560 to provide the level of heat desired.

The tool ports 555, 560 are arranged to physically engage the electrical tool 520 being attached such that the tool port 545, 550 firmly couples the electrical tool 520 to the base 515. Once coupled, the electrical tool 520 is substantially fixed with respect to the base 515. The tool ports 555, 560 also electrically connect the electrical tool 520 and the electrical component 510. In one arrangement, the tool ports 545, 550 each include two terminals that align with and engage two terminals on the electrical tool 520 to complete a circuit. Once the circuit is completed, power can be provided by the electrical component 510 as will be discussed with regard to FIG. 9. Similarly, the battery port 545, 550 physically engages a rechargeable battery pack 525 to couple the rechargeable battery pack 525 to the base 515. Once coupled, the battery pack 525 remains substantially stationary with respect to the base 515. In addition, the battery port 545, 550 electrically connects the attached rechargeable battery pack 525 to the electrical component 510 such that power can be provided to the rechargeable battery. In one construction, two terminals are provided in each of the battery ports 545, 550 and are arranged to connect with two terminals on the battery pack 525 to complete a circuit. Once the circuit is completed, power can be directed to or from the rechargeable battery pack 525 as will be described with regard to FIG. 9.

Figure 2:
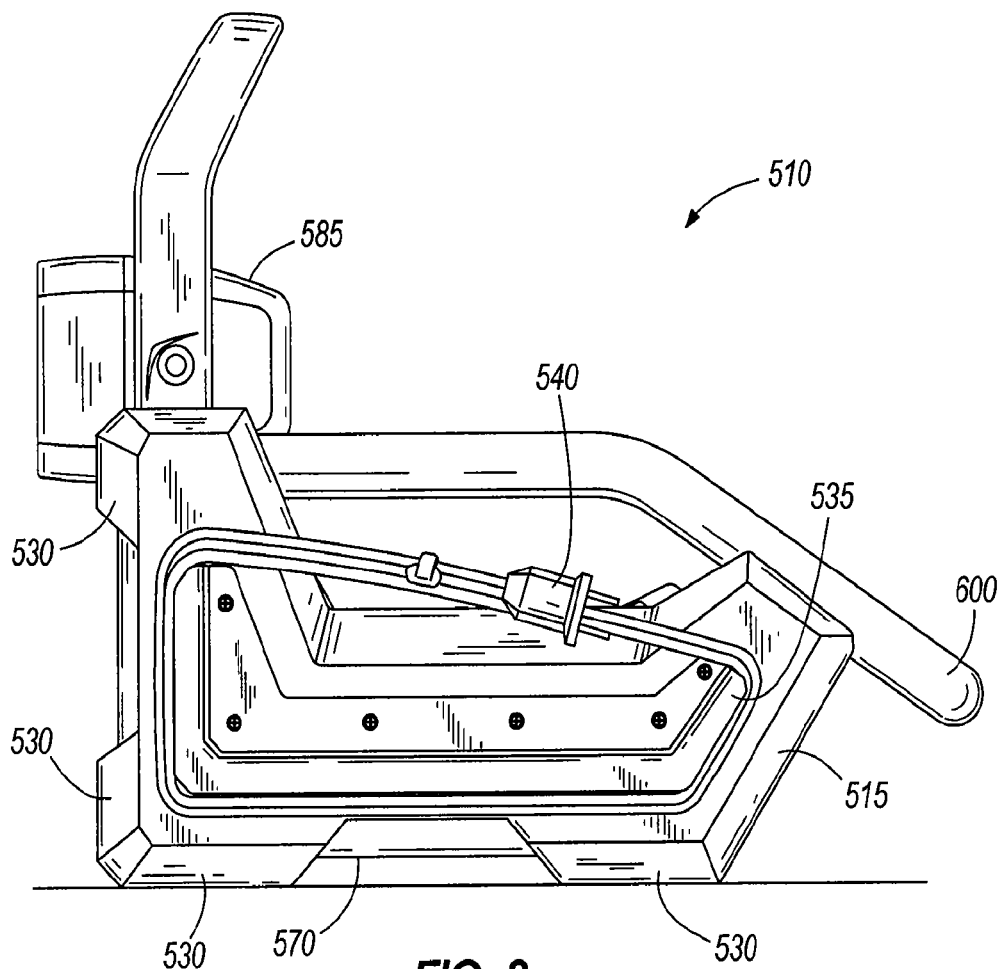
FIG. 2 is a first side view of the electrical component, rechargeable battery packs, and accessories of FIG. 2.
Figure 5:
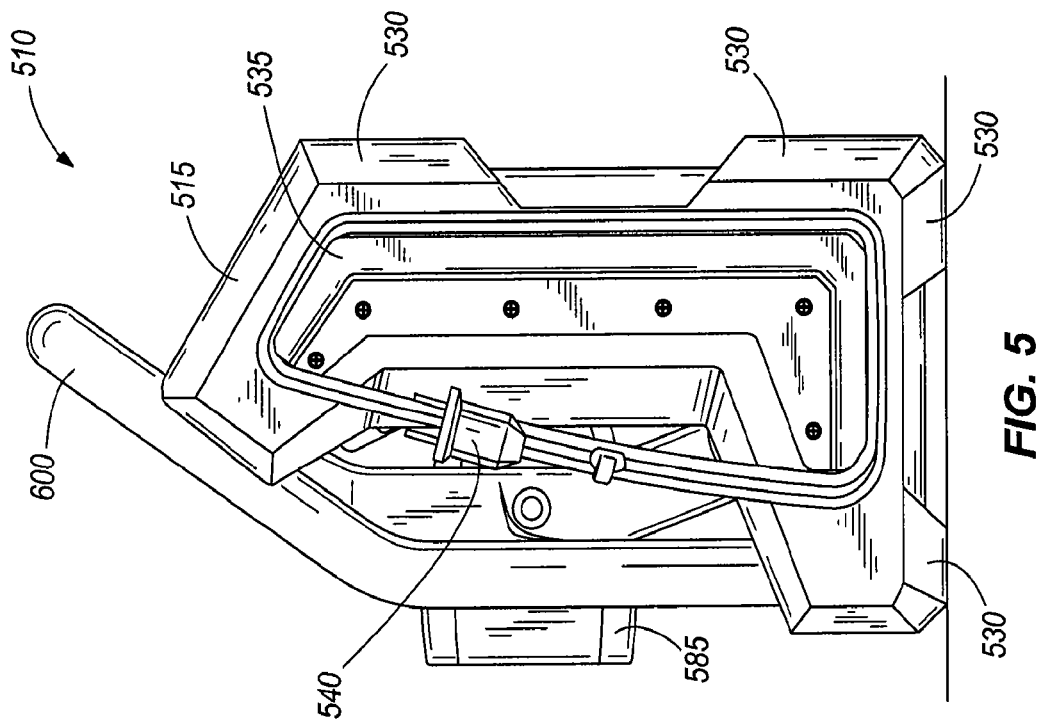
FIG. 5 is a side view of the electrical component of FIG. 1 in a second position with the accessory in the second position of FIG. 4.

One or more bars 600 attach to the base 515 and are positioned to protect the external components (i.e., battery packs 525, electrical tools 520, etc.) from impact or other forces that might cause damage. In addition, the bar or bars 600 can be used to hang the electrical component 510 if desired. Thus, the electrical component 510 can be positioned in a horizontal orientation in which the base 515 supports the remaining components or in any other orientation in which the electrical component 510 hangs from one or more of the bars 600. In the illustrated construction, a single bar 600 is bent to extend in front of the battery packs 525, thereby affording them some protection. As noted, other constructions could include other bars 600 that extend over the top of the battery packs 525 to provide additional protection for the battery packs 525 or could extend in the vicinity of the electrical tools 520 to provide them with a measure of protection. As illustrated in FIG. 2, the base 515 defines feet 530 that can also be used to support the base 515 in a horizontal position as illustrated in FIG. 2, or a vertical position as illustrated in FIG. 5.

Returning to FIG. 1, as noted the base 515 encloses and protects internal components such as circuits, voltage regulators, transformers, cooling fans, and the like that may be needed to charge the battery packs 525 and to power the electrical tools 520. For example, the base 515 can enclose the electrical components illustrated in FIG. 9. Specifically, the base 515 in this construction encloses an AC to DC converter 700, a battery charging circuit 805, a switching module 806, and various wires, connectors, and other components needed to complete the desired circuits.

With reference to FIG. 9, the electrical components are arranged in a circuit 795 including a power input 810 that allows for the connection of the electrical component 510 to an AC power supply such as a common 110V wall outlet. In some constructions, the circuit provides for the connection to a 220V power supply rather than or in addition to connection to a 110 V supply. Of course other voltages and frequencies could be accommodated as may be required by the particular power supplies available in the region in which the device is being used.

The input power is connected to the switching module 806 which could include a series of switches, relays, diodes, transistors, etc. or other devices that allow for the control of power flow along various paths and in various directions. The switching module 806 provides for connections between the power input 810, the AC to DC converter 800, the battery ports 545, 550 and the tool ports 555, 560. The switching module controls the flow of power depending largely on whether or not the external power input 810 is available. When power from the power input 810 is available, the switching module 806 senses this power and is configured to inhibit power flow from line 1000 to line 1001. Instead, power is directed to the AC to DC converter 800, to the battery charging circuit 805, and to the external outlet 595. The external outlet allows the user to plug in additional power tools or additional electrical components as desired. In preferred constructions, the external outlet 595 is a GFCI (ground fault circuit interrupter) outlet 595 with other outlets also being possible. The AC to DC converter 800 operates in a known manner to convert the incoming AC power to a DC power at a desired voltage. The DC power output by the AC to DC converter 800 is directed to the tool ports 555, 560 to provide DC power to any tools 520 that may be connected to the electrical component 510.

The battery charging circuit 805, which in some constructions is microcontroller based, provides power to the battery ports 545, 550 and charges any rechargeable battery packs 525 that may be positioned in the battery ports 545, 550. In some constructions, the battery charging circuit 805 receives DC power from the AC to DC converter 800 rather than AC power from the external power input 810. In these constructions, line 1002 extends directly from the AC to DC converter 800 to the battery charging circuit 805 rather than from the AC power connection between the switching module 806 and the AC to DC converter.

When power is not available from the external power input 810, the switching module 806 senses the lack of AC power and reconfigures to disconnect the AC to DC converter 800 and the battery charging circuit 805, and to allow power flow from line 1000 to line 1001. Thus, the battery packs 525 positioned in the battery ports 545, 550 can provide DC power to electrical tools 520 in the tool ports 555, 560 when the AC power source is not available. The circuit 795 facilitates the operation of electrical tools 520 that are coupled to the tool ports 555, 560 using an AC power supply when available and DC power provided by battery packs 525 when the battery packs 525 are attached to the battery ports 545, 550 and the AC power is not available. The circuit 795 also facilitates the charging of the battery packs 525 when AC power is available and the battery packs 525 are attached to the battery ports 545, 550.

A cord wrap 535, shown in FIG. 2, attaches to, or is formed as part of the base 515 and provides a location for wrapping an electrical cord 540. In preferred constructions, the electrical cord 540 is configured to plug into a standard wall outlet or other outlet to receive AC power to power the circuit 795, charge the battery packs 525, and provide power to the electrical tools 520.

Figure 7:
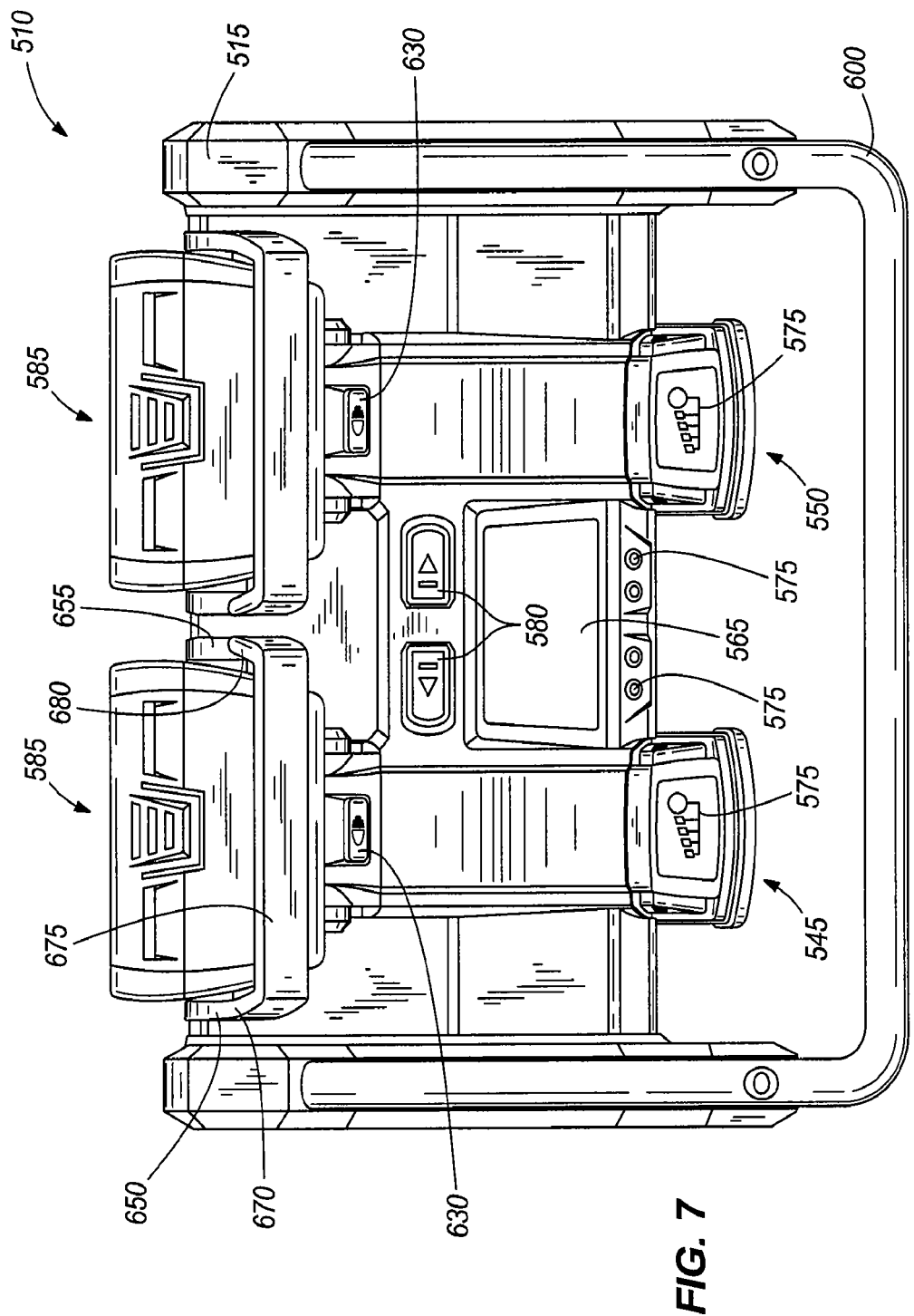
FIG. 7 is a top view of the electrical component of the FIG. 1 with the rechargeable battery packs and the accessory attached and in the position of FIG. 1.

As illustrated in FIGS. 1 and 7, the base 515 includes the first battery port 545 and the second battery port 550. As discussed, each battery port 545, 550 is configured to physically and electrically connect the base unit 515 to one rechargeable battery pack 525. The base 515 also at least partially defines the first tool port 555, the second tool port 560, and a control panel 565 that is preferably positioned such that it can be easily seen and accessed when the electrical component 510 is in an operating position. In the construction illustrated in FIGS. 1 and 7, the control panel 565 is positioned between the battery ports 545, 550 on a face of the base 515 that is substantially parallel to a bottom 570 of the base 515. Thus, when the electrical component 510 is positioned on the bottom feet 530 of the base 515, as illustrated in FIG. 1, the control panel 565 faces upward and is easily accessible by a user. The control panel 565 includes a plurality of LEDs or other indicators 575 that are each associated with one of the battery ports 545, 550 or tool ports 555, 560. In one construction, each port 545, 550, 555, 560 is associated with a multi-color LED 575 that indicates the charge status of the battery pack 525 or operational status of the tool 520 plugged into that port 545, 550, 555, 560. As one of ordinary skill in the art will realize, many different indicator arrangements, including but not limited to digital readouts, gauges, dials, lights, LEDs, sound-producing devices, and the like could be employed to convey information regarding each port 545, 550, 555, 560 to a user. As such, the invention should not be limited to the construction illustrated herein.

With reference to FIG. 7, the control panel 565 also includes two eject buttons 580, each associated with one of the tool ports 555, 560. Each eject button 580 releases one of the electrical tools 520 when it is positioned in the associated tool ports 555, 560. In preferred constructions, the eject buttons 580 release a locking mechanism and partially eject the tool 520 to aid the user in removing the tool 520. For example, in one construction, the eject button actuates a hook member that engages a slot or recess in the electrical tool 520 to release the electrical tool 520 for removal. A biasing member abuts the electrical tool and is biased to push the electrical tool 520 out of the tool port 555, 560. In one construction a spring biased member is moved to a compressed position during the insertion of the tool 520 and is held in that state by the hook member's engagement with the recess or slot. Once released, the biasing member immediately biases the tool 520 outward. Of course other locking mechanisms and eject mechanisms could be employed if desired. In addition, the locking mechanism and biasing mechanism just described could be applied to a battery port 545, 550 releasably lock a battery pack 525 in a battery port 545, 550 and to eject the battery pack 525 from the battery port 545, 550.

In the example illustrated in FIG. 7, the eject button 580 allows the user to remove the electrical tool 520 with little chance of touching any hot surfaces that may exist. However, other constructions could provide a button 580 that simply unlocks the tool 520 but does not eject the tool 520. In still other constructions, a similar pair of buttons is provided to release and eject the battery packs 525 from the battery ports 545, 550. As with the tool eject buttons 580, the battery eject buttons 580 can be configured to simply release the battery packs 525, release and eject the battery packs 525, or simply eject an unlocked battery pack 525.

Each of the battery ports 545, 550 is configured to receive a particular battery pack 525 and support that battery pack 525 on the base 515. Two or more terminals are exposed within each port 545, 550 and are positioned to engage two or more terminals on the battery packs 525 to facilitate charging and discharging of the battery packs 525. In preferred constructions, a locking mechanism engages the battery pack 525 to inhibit the unwanted removal of the battery packs 525 from the battery port 545, 550. However, other constructions may employ a snug fit that firmly holds the battery packs 525 in place but still allows for the removal of the battery packs 525 without disengaging a lock mechanism. The arrangement of the battery ports 545, 550 is such that the battery packs 525 are positioned such that the base 515, with the help of the bar at least partially surrounds the battery packs 525 to provide protection from impacts. Thus, if the electrical component 510 is dropped or impacted by another object, the battery packs 525 are not generally directly impacted and are protected from damage or destruction.

The tool ports 555, 560 are similar to the battery ports 545, 550 in that they are configured to receive and hold an electrical tool 520 on the base 515. Each port 555, 560 includes a space, surface, or opening that receives a portion of the electrical tool 520 and locks the tool 520 in position to inhibit unwanted release. In preferred constructions, each tool port 555, 560 includes two or more electrical terminals that are positioned to connect to two or more terminals on the electrical tool 520 to facilitate the delivery of power to the electrical tool 520.

FIGS. 1-7 illustrate the electrical tool 520 as being a light 585 that is held by the base 515. However, other electrical tools 520 can also be supported by the base 515. For example, FIG. 8 illustrates fans 590 being held by the base 515 rather than lights 585. Of course, other electrical tools 520 or combinations of electrical tools 520 could be held by the base 515 if desired. For example, other electrical tools 520 that could connect to the base 515 include, but are not limited to heated fans, and boom/area lights. In fact virtually any additional tool 520 that is typically used in a stationary manner, can be powered by AC or DC power, and that can be removed and used in a cordless fashion powered by a battery pack 525 attached directly to the tool 520 could be employed.

Figure 3:
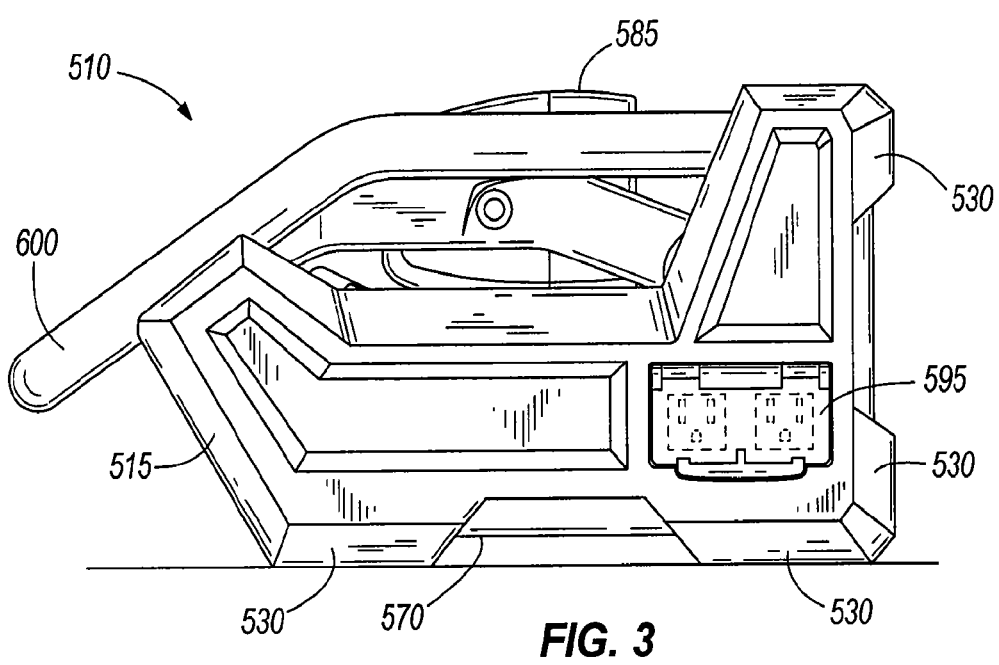
FIG. 3 is a second side view of the electrical component, rechargeable battery packs, and accessories of FIG. 2.

With reference to FIG. 3, the base 515 can also support an AC outlet 595 that can be used to provide power to corded electrical tools 520 or other devices such as, but not limited to drills, saws, lights, fans, radios, and the like. In the illustrated construction, the outlet 595 is a ground fault circuit interrupter (GFCI) outlet 595. However, other constructions may provide a standard outlet, or outlets of differing voltage output.

Figure 6:
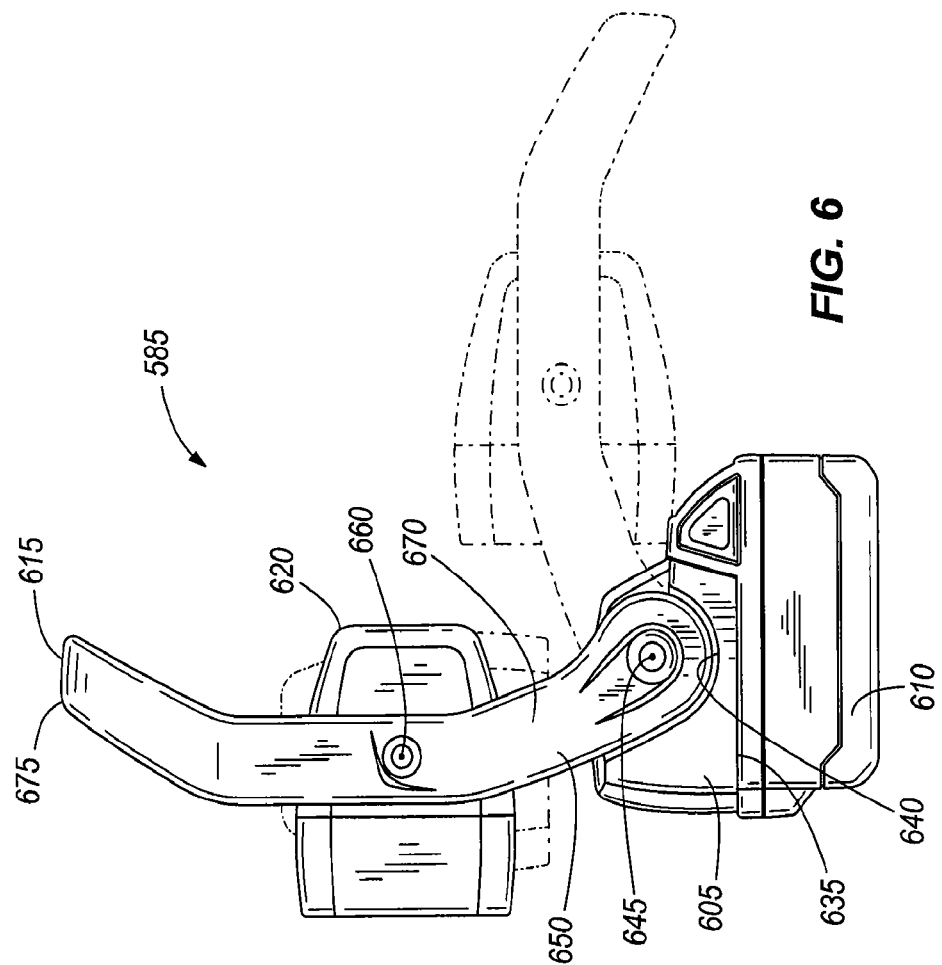
FIG. 6 is side view of the accessory attached to a rechargeable battery pack showing the first position and the second position.

FIG. 6 illustrates an electrical tool 520 in the form of a light 585 after it has been removed from the base 515 and attached to a battery pack 525. Once removed, the light 585 can be positioned anywhere the user would like to provide the desired light. The light 585 includes a body 605, a handle 615, and a light housing 620 containing one or more light sources 625. The body 605 is preferably formed from plastic and is configured to define an interior space. The body 605 is arranged to connect to either the battery pack 525 or one of the tool ports 555, 560 and to the handle 615. The interior space houses an electrical circuit that may include a voltage regulator that draws power from the battery pack 525 and provides power to the light sources 625. A switch 630 is positioned in the body 605 and allows the user to selectively provide power to the light sources 625.

The battery pack 525 connects to the body 605 adjacent a bottom surface 635 such that the body 605 and the light 585 can be supported by the battery pack 525 when the battery pack 525 is placed on a horizontal surface. The body 605 includes two exposed terminals that connect with two battery pack terminals to facilitate the transfer of electricity between the body 605 and the battery pack 525.

The body 605 includes two recesses 640 that are positioned opposite one another. In the illustrated arrangement, the recesses 640 are J-shaped and are positioned to receive the handle 615. The handle 615 is free to pivot about a pivot axis 645 within the recesses 640 between a first position where the handle 615 is substantially vertical and a second substantially horizontal position. Thus, the handle 615 is pivotable through about 90 degrees. The shape of the recess 640 inhibits movement beyond the first and second positions. In preferred constructions, the handle 615 is free to move to any point between the first position and the second position. In other constructions, several discrete positions are established and the handle 615 locks into these positions as it is moved through them. In one of these constructions, a projection is formed on one of the handle 615 and the body 605, while the other of the handle 615 and body 605 includes several detents that receive the protrusion. As the protrusion engages a detent, the handle 615 is locked into a predetermined position. With a slightly increased force, the user can move the handle 615 to the next position.

With reference to FIG. 1, the handle 615 includes a first arm 650 and a second arm 655. The first arm 650 extends from the pivot axis 645 to a light pivot axis 660 and then beyond the light housing 620. The second arm 655 extends from the pivot axis 645 to the light pivot axis 660 where the second arm 655 ends. Thus, as illustrated in FIG. 1, the handle 615 includes an open space 665 that allows the user to hang the light 585 using the handle 615. To further facilitate hanging, the first arm 650 includes a first portion 670 that extends from the light pivot axis 660, a second portion 675 that extends across a long axis 780 of the light housing 620 substantially normal to the first portion 670, and a third portion 680 that extends substantially normal to the second portion 675. This arrangement creates a hook feature 685 that allows a user to easily hang the light 585. A notch 688 in the second portion 675 is sized to receive a protruding fastener such as a nail or a screw to better hang the light 585.

The light housing 620 attaches to the first arm 650 and the second arm 655 such that the housing 620 is pivotable about the long axis 780 of the housing 620. In the illustrated construction, the light housing 620 pivots through about 180 degrees with greater or less pivoting also being possible. The pivotability of the handle 615 and the light housing 620 allows the user to direct light as required for a particular project. For example, FIG. 1 illustrates the handle 615 in the first position and the light housings 620 in a middle position. In this arrangement, the emitted light is directed substantially parallel to the control panel 565. When arranged as illustrated in FIG. 3, the handle 615 is rotated to the second position, and the light housing 620 is rotated toward the body 605 of the light 585. In this arrangement the electrical component 510 is very compact and the light is again emitted in a direction parallel to the control panel 565. The light housing 620 could be rotated 180 degrees from that illustrated in FIG. 3 to emit light in the opposite direction. As can be seen, the light housing 620 and the handle 615 can be positioned in virtually any position desired by the user.

Figure 4:
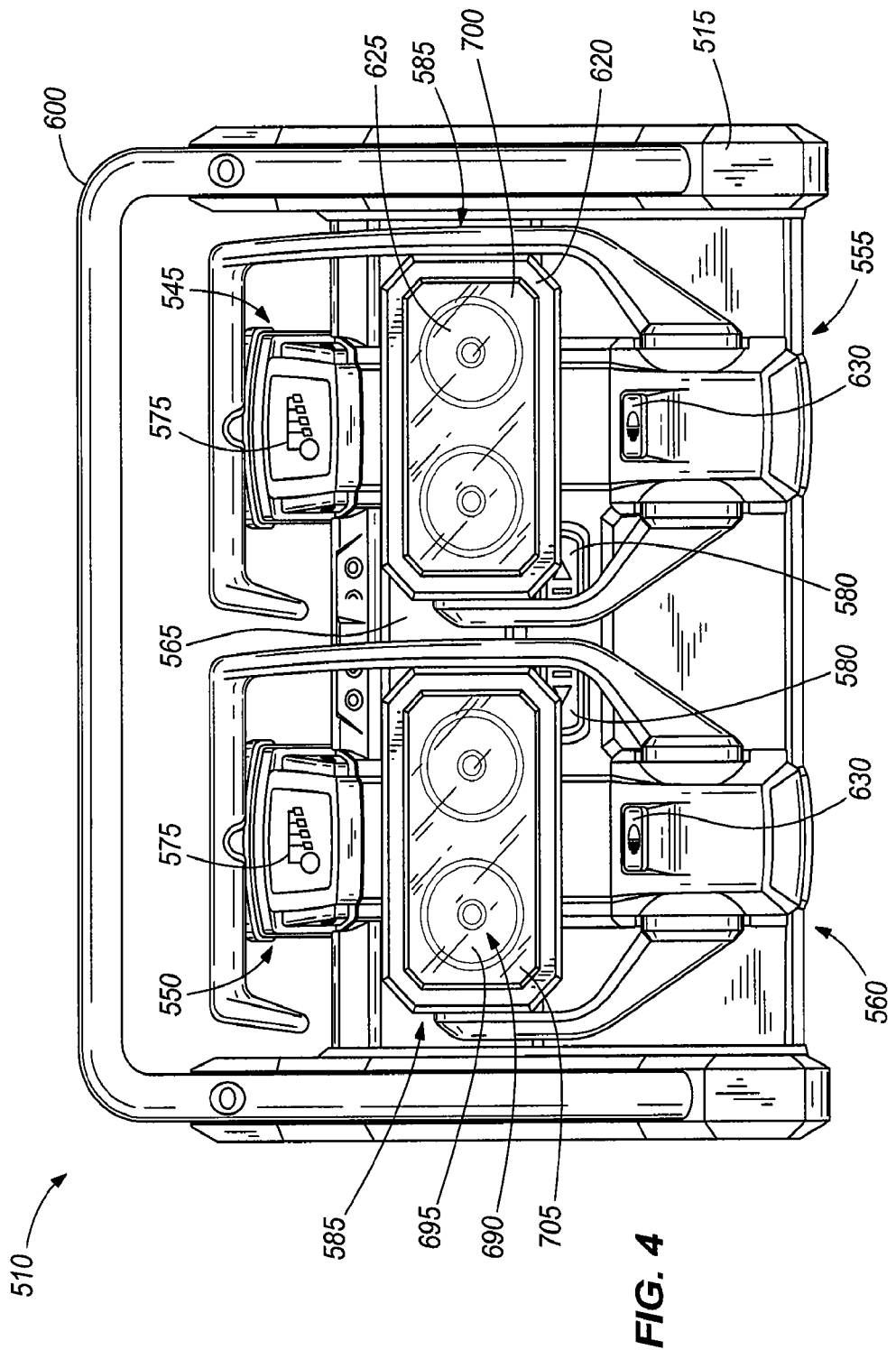
FIG. 4 is a top view of the electrical component of FIG. 1 with the accessories in a second position.

With reference to FIG. 4, the light housing 620 includes two sockets 690 that each receives a bulb 695 that emits light when powered. In the illustrated construction, halogen light bulbs 695 are used as the light source. In one construction, the halogen bulbs 695 are run at a slightly higher than rated voltage. The higher voltage provides greater brightness at the sacrifice of some bulb life. The halogen bulbs 695 employed do not get so hot as to be difficult to handle 615 and operate better in cold weather than would a fluorescent bulb 695. Of course other constructions, could employ more or fewer bulbs 695 or could use another type of bulb 695 (e.g., fluorescent, incandescent, LEDs, etc.). A reflector 700 is typically positioned behind the bulbs 695 to reflect emitted light in the desired direction. A glass or plastic cover 705 is also typically positioned in front of the bulbs 695 to protect the bulbs 695 from damage.

To further improve battery pack life, each light 585 can be provided with a switch 630 that allows the user to select one of the bulbs 695 for operation. In these constructions, the switch 630 can be moved between a first position in which power is provided to the first bulb 695 alone, a second position in which power is provided to the second bulb 695 alone, and a third position in which power is provided to both bulbs 695. Running a single bulb 695 rather than both bulbs 695 reduces the light output but increases the battery life.

While FIGS. 1-7 illustrate the electrical tool 520 as a removable light 585, it should be understood that other electrical tools 520 can be received by the same base 515. For example, FIG. 8 illustrates a battery powered fan tool 590 that can be received and powered by the base 515.

The fan tool 590 includes a fan body 710, a first arm 720, a second arm 725, a frame 730, and a plurality of fans 735. The fan body 710 engages the battery pack 525 in much the same was as the body 605 engages the battery pack 525 of the light 585. The fan body 710 supports each of the first arm 720 and the second arm 725 along a pivot axis 740 such that the arms 720, 725 are pivotable through about 90 degrees. Of course other constructions may provide for greater or less pivotability if desired. The body 710 could include a recess 745 for one or both arms 720, 725 that inhibits movement beyond the predetermined limits. In addition, as with the handle 615 and arms 650, 655 of the light 585, the arms 720, 725 of the fan tool 590 can freely pivot to any position, or can include predetermined set positions. If the set positions are employed, a projection and detent arrangement as was described with regard to the light tool 585 or other arrangement could be employed.

The frame 730 is substantially oval and attached to the first arm 720 and the second arm 725 along a second pivot axis 750. The frame 730 is pivotable about the second pivot axis 750 through about 180 degrees with greater or less pivotability being possible. In the illustrated construction, the frame 730 is an elongated oval that is sized to receive three fans 735. In other constructions, more of fewer fans 735 can be supported by the frame 730. The frame 730 also includes an inner hook 755 that is formed to provide a space that can receive a fastener to hang the fan tool 590 if desired.

Each of the fans 735 is supported within an outer ring 760 that connects to the frame 730. The outer ring 760 is connected to the frame 730 such that it, and the fan 735, is pivotable about a fan axis 765 that is parallel to the second pivot axis 750. Each fan 735 includes a blade 770 that is positioned within a fan housing 775 that pivotably connects to the outer ring 760 such that the fan housing 775 is pivotable about an axis 780 that is substantially normal to the fan axis 765. Thus, the air moved by each fan 735 can be precisely controlled by rotating the fan housing 775 and outer ring 760 in the desired direction.

While the present invention has been described as including removable light tools 585 and/or removable fan tools 590, other electrical tools 520 could be employed. In addition, different arrangements of the fans and lights could be employed if desired. As such, the invention should not be limited to the two examples illustrated herein.

Although the invention has been described in detail with reference to certain preferred embodiments, variations and modifications exist within the scope and spirit of one or more independent aspects of the invention as described.

In operation, the electrical component 510 or power station is plugged into a fixed AC power supply such as a wall outlet or portable generator socket. Once plugged in, AC power is provided to the external outlet 595, the AC to DC converter 800, and the charging circuit 805. The AC to DC converter 800 converts the power it receives to DC power and directs that power to the tool ports 555, 560 as may be required. If battery packs 525 are connected to the battery ports 545, 550, power is provided to the battery packs 525 to charge them. If tools 520 are present in the tool ports 555, 560, DC power is provided to the tools 520 as may be required to operate the tools 520. If the AC power supply is disconnected or suddenly becomes unavailable, DC power from the battery packs 525 connected to the battery ports 545, 550 can be directed to the tools 520 connected to the tool ports 555, 560 to operate the tools 520. In some situations, it may be desirable to make the tool 520 more mobile. In these situations, the tool 520 is disconnected from the tool port 555, 560 and is connected to a battery pack 525 to allow the battery pack 525 to provide DC power directly to the tool 520. Thus, the user is able to carry the tool 520 to any desired location without being hindered by the need to connect to an AC power supply.

Thus, the invention provides, among other things, an electrical assembly that provides power to a plurality of electrical tools 520 and rechargeable tool battery packs 525. Various features and advantages of the invention are set forth in the following claims.

What is claimed is:

1. An electrical assembly that selectively receives power from an external power supply, the electrical assembly comprising:
   a base that at least partially defines a tool port and a battery port;
   an electrical tool selectively coupled to the tool port, the electrical tool physically engageable with and removable from the tool port to attach the electrical tool to the base, the electrical tool electrically connected to the base through the tool port when attached to the tool port and movable between a first connected operating position and a second connected operating position;
   a rechargeable battery pack selectively coupled to the battery port, the rechargeable battery pack physically engageable with and removable from the battery port to attach the rechargeable battery pack to the base, the rechargeable battery pack electrically connected to the base through the battery port when attached to the battery port; and
   a circuit supported by the base and operable to direct power to the tool port and the battery port such that the external power provides power to the electrical tool to operate the electrical tool and to recharge the rechargeable battery pack, wherein the electrical tool is selectively and separately physically connectable to each of the tool port and the rechargeable battery pack; and
   a locking mechanism that locks at least one of the electrical tool and the rechargeable battery pack in the corresponding one of the tool port and the battery port.

2. The electrical assembly of claim 1, wherein the base further defines feet that support the base in a first orientation with respect to a horizontal support surface and a second orientation with respect to the horizontal support surface, the second orientation being rotated about 90 degrees from the first orientation.

3. The electrical assembly of claim 1, further comprising an eject button that is selectively actuatable to release the locking mechanism.

4. The electrical assembly of claim 3, wherein the locking mechanism includes an eject mechanism that at least partially disconnects the one of the electrical tool and battery pack from the respective tool port and battery port in response to actuation of the eject button.

5. The electrical assembly of claim 1, further comprising a power outlet coupled to the base.

6. The electrical assembly of claim 1, wherein the electrical tool is one of a light and a fan.

7. The electrical assembly of claim 1, further comprising a bar coupled to the base and positioned to protect at least one of the electrical tool and the rechargeable battery pack.

8. The electrical assembly of claim 1, wherein the electrical tool includes a handle movable between a first position and a second position without disconnecting the electrical tool from the tool port.

9. The electrical assembly of claim 1, wherein the base further includes a second tool port that removably receives a second electrical tool and electrically connects the second electrical tool to the circuit.

10. The electrical assembly of claim 9, wherein the base further includes a second battery port that removably receives a second rechargeable battery pack and electrically connects the second rechargeable battery pack to the circuit.

11. The electrical assembly of claim 1, wherein the circuit is operable to deliver power from the battery pack to the electrical tool in the absence of the external power supply.

12. The electrical assembly of claim 1, wherein the electrical tool is directly connectable to the battery pack such that the battery pack delivers power directly to the electrical tool.

13. An electrical component system comprising:
    a base at least partially defining a tool port and a battery port;
    a battery pack selectively connectable to the battery port, the battery pack physically received at least partially within the battery port to structurally attach the battery pack to the base, the battery pack electrically connected to the base through the battery port when attached to the battery port;
    an electrical tool selectively connectable to the tool port and the battery pack, the electrical tool physically received at least partially within the tool port to structurally attach the electrical tool to the base, the electrical tool electrically connected to the base through the tool port when attached to the tool port and movable between a first connected operating position and a second connected operating position, the electrical tool selectively and separately physically connectable to each of the tool port and the battery pack;
    a circuit positioned substantially within the base and operable in response to the receipt of an external AC power to convert the AC power to a DC power and deliver the DC power to the tool port to operate the electrical tool and to the battery port to charge the battery pack, and wherein in the absence of the external AC power, the circuit directs DC power from the battery pack to the electrical tool to power the electrical tool; and
    a locking mechanism that locks at least one of the electrical tool and the rechargeable battery pack in the corresponding one of the tool port and the battery port.

14. The electrical assembly of claim 13, wherein the base further defines feet that support the base in a first orientation with respect to a horizontal support surface and a second orientation with respect to the horizontal support surface, the second orientation being rotated about 90 degrees from the first orientation.

15. The electrical assembly of claim 13, further comprising an eject button that is selectively actuatable to release the locking mechanism.

16. The electrical assembly of claim 15, wherein the locking mechanism includes an eject mechanism that at least partially disconnects the one of the electrical tool and battery pack from the respective tool port and battery port in response to actuation of the eject button.

17. The electrical assembly of claim 13, further comprising a power outlet coupled to the base.

18. The electrical assembly of claim 13, wherein the electrical tool is one of a light and a fan.

19. The electrical assembly of claim 13, further comprising a bar coupled to the base and positioned to protect at least one of the electrical tool and the rechargeable battery pack.

20. The electrical assembly of claim 13, wherein the electrical tool includes a handle movable between a first position and a second position without disconnecting the electrical tool from the tool port.

21. The electrical assembly of claim 13, wherein the base further includes a second tool port that removably receives a second electrical tool and electrically connects the second electrical tool to the circuit.

22. The electrical assembly of claim 21, wherein the base further includes a second battery port that removably receives a second rechargeable battery pack and electrically connects the second rechargeable battery pack to the circuit.

23. The electrical assembly of claim 13, wherein the electrical tool is directly connectable to the battery pack such that the battery pack delivers power directly to the electrical tool.

24. An electrical component system comprising:
a base at least partially defining a tool port and a battery port;
a battery pack selectively connectable to the battery port, the battery pack physically engageable with and removable from the battery port to fix the position and orientation of the battery pack with respect to the base, the battery pack electrically connected to the base through the battery port when attached to the battery port;
an electrical tool selectively and separately physically connectable to each of the tool port and the battery pack, the electrical tool physically engageable with and removable from both the tool port and the battery pack to fix the position and orientation of the electrical tool with respect to the base and the battery pack, the electrical tool electrically connected to the base through the tool port when attached to the tool port and movable between a first connected operating position and a second connected operating position and electrically connected to the battery pack when attached to the battery pack;
a circuit positioned substantially within the base and operable to deliver power from one of an external source and the battery pack to the electrical tool, and wherein the electrical tool is directly connectable to the battery pack to receive power from the battery pack without the circuit; and
a locking mechanism that locks at least one of the electrical tool and the rechargeable battery pack in the corresponding one of the tool port and the battery port.

25. The electrical assembly of claim 24, further comprising an eject button that is selectively actuatable to release the locking mechanism.

26. The electrical assembly of claim 25, wherein the locking mechanism includes an eject mechanism that at least partially disconnects the one of the electrical tool and battery pack from the respective tool port and battery port in response to actuation of the eject button.

27. The electrical assembly of claim 24, wherein the base further includes a second tool port that removably receives a second electrical tool and electrically connects the second electrical tool to the circuit.

28. The electrical assembly of claim 27, wherein the base further includes a second battery port that removably receives a second rechargeable battery pack and electrically connects the second rechargeable battery pack to the circuit.

* * * * *